Nov. 25, 1952          J. R. PARSONS          2,619,625

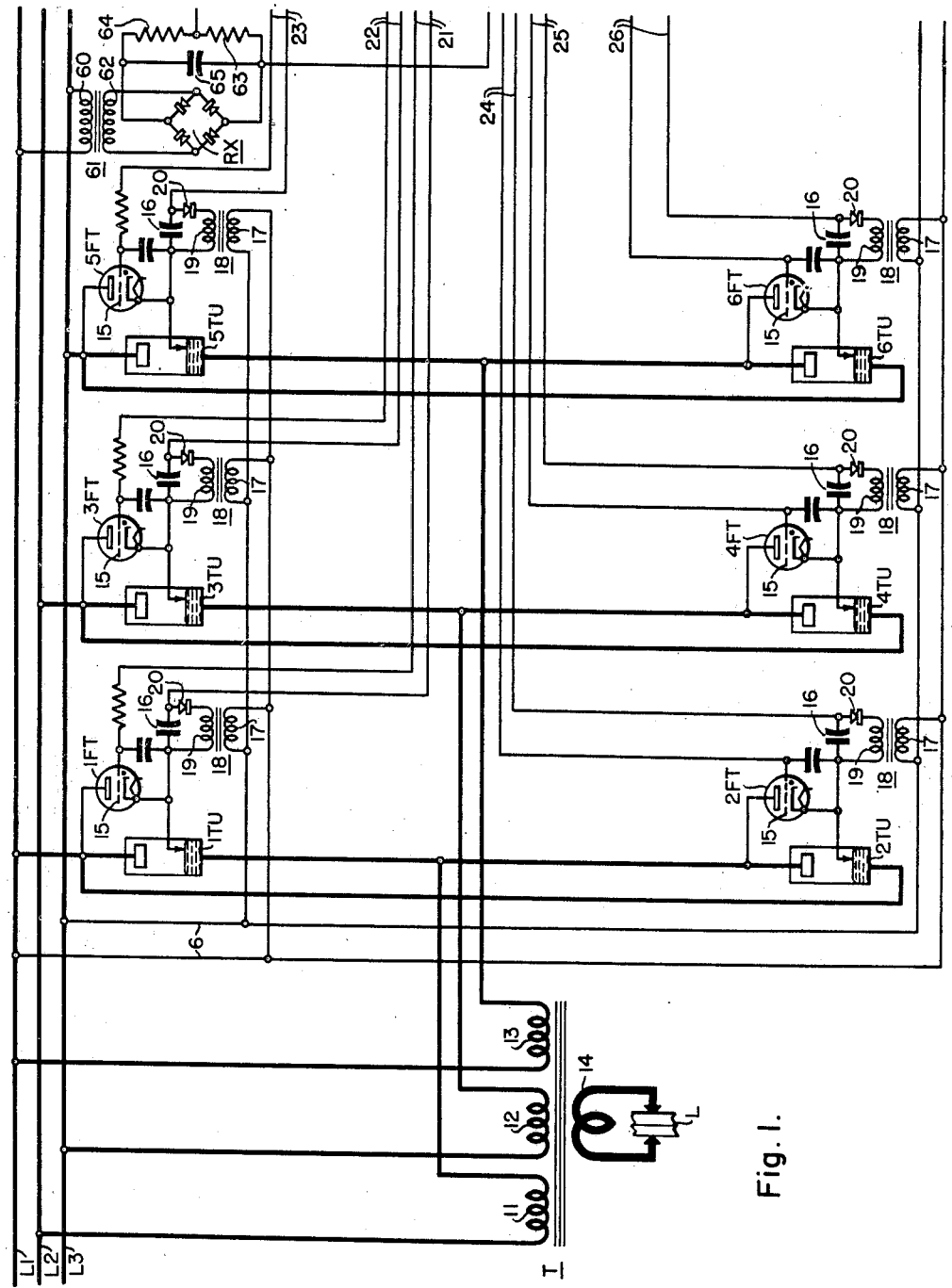
Fig. I.

FREQUENCY CONVERTER CONTROL

Filed July 1, 1949          4 Sheets-Sheet 3

WITNESSES:
Robert A. Baird
William T. Wofford

INVENTOR
John R. Parsons.
BY
Hymen Diamond
ATTORNEY

Nov. 25, 1952  J. R. PARSONS  2,619,625
FREQUENCY CONVERTER CONTROL
Filed July 1, 1949  4 Sheets-Sheet 4

WITNESSES:
Robert A. Baird
William T. Wofford

INVENTOR
John R. Parsons.
BY
Hymen Diamond
ATTORNEY

Patented Nov. 25, 1952

2,619,625

UNITED STATES PATENT OFFICE 2,619,625

FREQUENCY CONVERTER CONTROL

John R. Parsons, Kenmore, N. Y., assignor to Westinghouse Electric Corporation, East Pittsburgh, Pa., a corporation of Pennsylvania Application July 1, 1949, Serial No. 102,473

18 Claims. (Cl. 321—7)

1

My invention relates to electric discharge apparatus and it has particular relation to resistance welding apparatus. The invention is an outgrowth of my experience with low frequency welding apparatus of the type disclosed in the following application, which is assigned to the Westinghouse Electric Corporation:

| Serial No. | Inventor | Filed |
|---|---|---|
| 18,699 | J. R. Parsons | April 2, 1948. |
| 52,103 | J. R. Parsons | September 30, 1948. |
| 52,104 | C. B. Stadum and J. R. Parsons | September 30, 1948. |
| 52,105 | E. C. Hartwig and J. R. Parsons | September 30, 1948. |
| 87,684 | C. B. Stadum | April 15, 1949. |
| 87,714 | J. R. Parsons | April 15, 1949. |

The above-listed applications relate to welding systems in which power is derived from an alternating current commercial supply and supplied to a load such as a welding transformer at a substantially lower frequency than that of the supply. The supply may be of the single-phase or polyphase type. The conversion from the commercial frequency to the lower frequency is effected by operation of electric discharge valves, usually ignitrons, interposed between the supply buses and the primary of the welding transformer. Preferably, the ignitrons are subdivided into pairs, each pair being connected in anti-parallel to a section of the primary of the welding transformer and each section and its associated pairs being connected across a pair of buses of the supply. The individual ignitrons of the pairs are so controlled that first current of one polarity is built up in the welding transformer and permitted to decay, and immediately thereafter current of the opposite polarity is built up and permitted to decay. The ignitrons of each pair which conduct the current of each polarity I will designate a group.

In operating apparatus of the type shown in applications, Serial Nos. 18,699, 52,103, 52,104 and 52,105, I have found that it is on the whole satisfactory. I have, however, encountered situations in which certain of the ignitrons have a relatively short life in operation. In such situations the ignitrons are severely damaged after the apparatus is operated for only a short time; sometimes the damage is so severe that the ignitrons must be replaced. In addition the load may also be damaged. In particular, I have found that such difficulties arise when the apparatus is operated with a load having a low power factor such as arises when the welding electrodes are short-circuited for test purposes, and when the apparatus constitutes a substantial drain on the power supply from which it is energized.

In operation of the systems disclosed in the above-listed applications, one ignitron of each pair of anti-parallel connected ignitrons, that is of each group, is rendered conductive when the bus to which its anode is connected becomes positive relative to the other buses, and conducts in its turn during a low frequency half period until the current built up in the load has the desired low frequency amplitude. The last ignitron of the group to conduct carries the maximum current. When this current is reached, the first ignitron of the conducting group is not again fired. As the current decays in the load, the last ignitron of the group continues to conduct. The current during the low frequency half period of the opposite polarity is now to be conducted by the other ignitrons of each pair. Each of the latter is rendered conductive in its turn, as the bus to which its anode is connected becomes more positive than the other buses of the supply. I have found that the damage to the ignitrons arises from the fact that when the first of the ignitrons which conducts the current of the reverse polarity is rendered conductive, the last of the ignitrons which conducts the current of the initial polarity is still conductive. The current conducted by the first ignitron to conduct the reverse current induces potential in the winding supplied from the last ignitron to conduct the current of the initial polarity in such a sense as to build up the decaying conductivity of this last ignitron. The latter, therefore, conducts for an excessively long interval. In addition the current supplied to its corresponding winding through the first ignitron of the new group is returned to the supply through the last ignitron of the old group. A short circuit is thus in effect produced. Because the last ignitron of the old group conducts for an excessively long interval under short circuit conditions it soon becomes hot, fails to deionize and carries current of both polarities continuously. The same condition arises as the last ignitron to conduct the reverse current continues conductive after the first ignitron to conduct the current of the initial polarity is rendered conductive during the succeeding low frequency half period. This phenomenon is more common at low power factors than at high power factors, and is particularly marked when the apparatus is operated with the welding electrodes short-circuited for test purposes.

In the prior art of which I am aware, various solutions to this problem have been proposed.

For example, one proposal provides a relay system for interlocking the low frequency determining impulse timer with the load current circuit, so that a low frequency impulse time cannot start until the load current in the low frequency half cycle immediately preceding has decayed to zero. While this proposal does avoid damage to the discharge devices due to the phenomenon discussed above, so long as the relays function properly it has the disadvantage of not being positive in its operation. This is particularly true in welding applications, where the discharge devices are in series with the primary windings of the welding transformer. The load current is allowed to decay to zero as it will, making it uncertain which discharge device in the next low frequency period will fire first and when in its half cycle it will fire. Such uncertainty will result in different degrees of load current build-up for succeeding low frequency half cycles. Consequently, over a period of time, the total load current passed through the transformer windings on low frequency half cycles of one polarity will exceed the total load current passed through the transformer windings on low frequency half cycles of the opposite polarity, and this condition will tend to saturate the welding transformer. With such systems, it has been the practice to hedge the problem of saturation by the provision of a large welding transformer, which is heavy, bulky, and costly.

In the above described apparatus the last tube in each group is permit to conduct so long as the back electromotive force generated by the load is sufficient to cause current to flow through it. The back electromotive force decreases as this conduction continues, it is not positively decreased. The last tube of each group may therefore conduct during substantially longer intervals than the other tubes. This excessive conductivity may substantially shorten the lives of the last tubes.

In my application 87,714, I provide means to prevent rapid build-up of the load current, so that load current decay time is diminished to a reasonable value. With this system, the load current ordinarily will decay to zero in each low frequency half cycle in time for the proper discharge device on the opposite low frequency half cycle to fire consistently at the same time in its half cycle. Therefore, ordinarily there is no damage to the discharge devices due to the phenomenon previously discussed and the same total load current is passed through the welding transformer primary windings for opposite low frequency half cycles. Consequently, a relatively small and less costly transformer may be used with little danger of saturation. I have found that the system disclosed in my application Serial No. 87,714 is on the whole satisfactory. While it represents an important improvement over the prior art of which I am aware, yet its operation is not positive.

It is, accordingly, an object of my invention to provide in a low frequency welding system of the electronic type in which the electronic discharge devices through which the load current is supplied shall operate without becoming seriously impaired in a short time.

Another object of my invention is to provide in a welding apparatus of the electronic type in which the load current is conducted through electric discharge devices, positive means to prevent serious damage to the said electric discharge devices.

Another object of my invention is to provide in a welding apparatus of the electronic type in which the load current is conducted through electric discharge devices, positive means to prevent serious damage to the said electric discharge devices and at the same time avoid a tendency toward saturation of the welding transformer.

A further object of my invention is to provide a welding apparatus of the electronic type in which the load current is conducted by electric discharge devices wherein the tendency toward saturation of the welding transformer due to the passage of more load current on cycles of the opposite polarity is positively prevented.

Still another object of my invention is to provide an electronic control system for converting power derived from a commercial supply to a substantially lower frequency to be supplied to a load such as a welding transformer which shall operate over long periods of time without serious impairment to the electric discharge valves which conduct the load current.

A still further object of my invention is to provide an electronic converter for deriving power from an alternating supply at a substantially lower frequency than the supply which shall operate without damage to the load.

An ancillary object of my invention is to provide an electronic control system in apparatus for deriving power from an alternating source and converting it to power of a frequency substantially lower than that of the alternating source, which shall include an electronic means to interlock the low frequency cycle of one polarity with the low frequency cycle of the opposite polarity.

Another ancillary object of my invention is to provide a novel control circuit for controlling the firing of the main discharge valves in systems such as are shown in the above-listed applications.

A further ancillary object of my invention is to provide a converter, in which individual tubes of groups of tubes are fired in sequence during successive predetermined time intervals, in the operation of which (converter) the time during which the last valves of each group conducts shall be minimized.

In accordance with my invention the first electric discharge device of a group which fires successively to conduct during a low frequency half period of one polarity is also fired late in its corresponding half period of the supply immediately following the firing of the last electric discharge device of the group to be fired in the said low frequency half period. The current flow in said electric discharge device is then of a polarity which will cause rapid decay of the load current. Then the electric discharge device which is connected inversely in parallel with said first electric discharge device, may be fired consistently at a particular time in the half period of its phase which immediately follows that in which said first discharge device was fired.

The said first discharge device of the first group conducts current through the load in such a sense as to extinguish the last discharge device of the first group and continues to conduct so long as the counterelectromotive force built up by the decay of flux in the load forces current through it. Since the first discharge device of the second group is connected directly in anti-parallel to this first device of the first group it cannot fire while the first discharge device of the first group is conducting. There is then a direct positive electronic interlock between low frequency half periods of opposite polarity so that one cannot start until a preceding one is complete. Further in welding applications, the rapid decay of load current allows the firing of the groups of electric discharge devices in a manner such that the total load current of one polarity which is passed through the primary of the welding transformer is equal to the total load current of the other polarity, and there is no tendency to saturate the welding transformer.

The novel features that I consider characteristic of my invention are set forth with particularity in the appended claims. The invention itself, however, both as to its organization and its method of operation, together with additional objects and advantages thereof, will be understood from the following description of a specific embodiment when read in connection with the accompanying drawings, in which:

Figures 1 and 1A together constitute a circuit diagram of a preferred embodiment of my invention;

For a proper understanding of my invention, it is desirable that the operation of the apparatus shown in any of the above-listed applications be understood. To facilitate the explanation of my invention, I shall, accordingly, briefly discuss the operation of the apparatus shown in Figs. 1, 2 and 3 of application Serial No. 52,103.

Figure 1A:
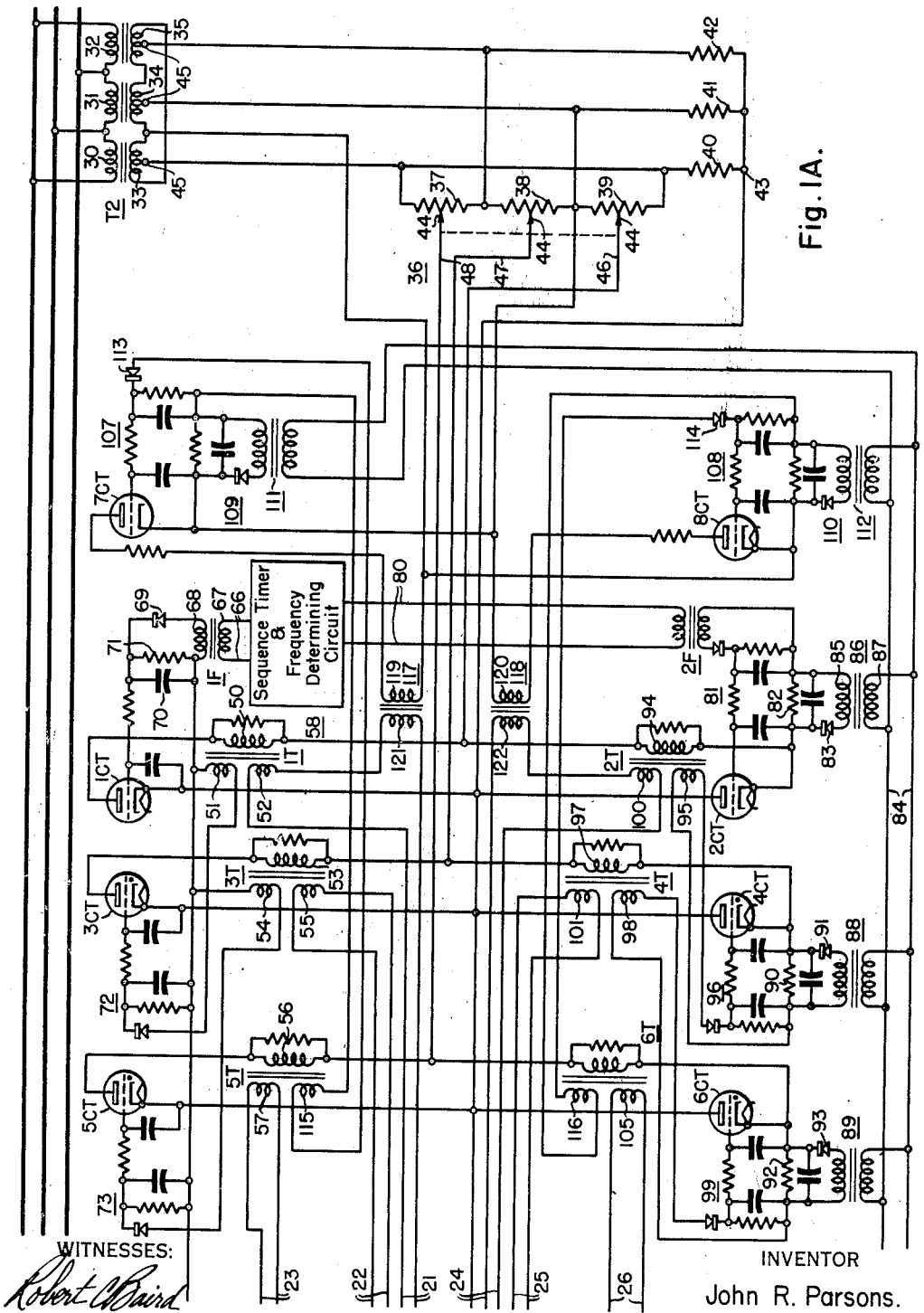
Figure 2:
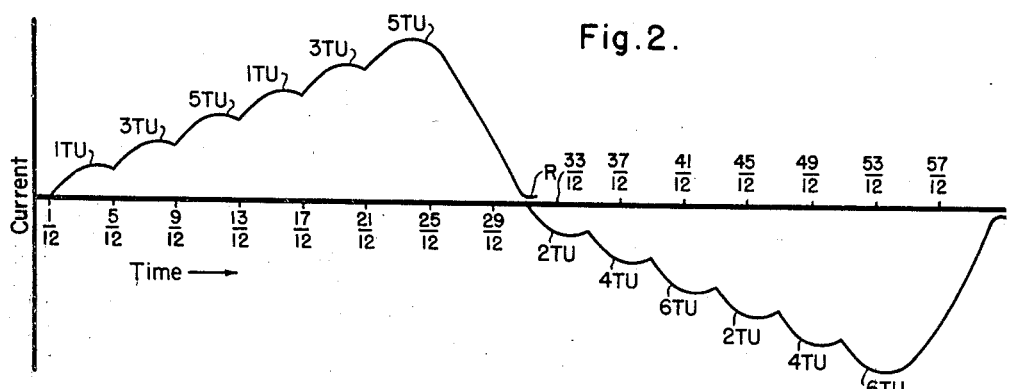
Fig. 2 is a graph illustrating the operation of the prior art apparatus.

Figs. 1 and 2 are of particular interest and these figures are the same as Figs. 1 and 1A of the present application as to structure and labeling of components except that Figs. 1 and 2 do not include the thyratrons 7CT and 8CT and their associated circuits. The structure and operation of the apparatus shown in application Serial No. 52,103, may, therefore, be understood from the following discussion which refers to Figs. 1 and 1A of the present application modified as described above.

This apparatus includes a welding transformer having three primary windings 11, 12 and 13. The primaries are supplied from the buses L1, L2, L3 of a three-phase source through three pairs of ignitrons, 1TU, 2TU, 3TU, 4TU, and 5TU, 6TU each connected in anti-parallel. The buses L1, L2, L3 are customarily the buses of a commercial alternating current supply which in the United States has a frequency of 60 cycles and in other countries may have a different frequency, such as 50 cycles, for example. Power is supplied to the primaries 11, 12 and 13 in sequence, first in one direction during one low frequency half period through ignitrons 1TU, 3TU and 5TU constituting one group, and then during the succeeding low frequency half period in the opposite direction through ignitrons 2TU, 4TU and 6TU constituting another group. When ignitrons 1TU, 3TU and 5TU are conductive, current flows from right to left through each of the primaries 11, 12 and 13, and when ignitrons 2TU, 4TU and 6TU are conductive, current flows from left to right. Each of the ignitrons becomes conductive when the bus to which its anode is connected is positive relative to the other buses and the proper control potential to fire its firing thyratron is impressed. The instant when an ignitron becomes conductive is determined by the setting of the taps 44 on the rheostat 36. The ignitrons 1TU, 3TU and 5TU, or 2TU, 4TU and 6TU, respectively, conduct in their turn during a predetermined number of successive periods of the supply which is determined by the low frequency is desired. For example, we may assume that each of the ignitrons conducts twice during each low frequency half period of the supply. Under such circumstances the low frequency is of the order of 12 cycles per second.

The apparatus described, on the whole, operates satisfactorily; but at low power factors the last of each of the ignitrons to conduct, that is, the ignitrons 5TU and 6TU may continue to conduct indefinitely. This operation is illustrated in Fig. 2 of the present application. In this view, the current built up in the welding transformer T is plotted as a function of time. Current is plotted vertically and time horizontally. To facilitate understanding equally spaced abscissae, corresponding to instants when successive ignitrons become conductive, are labeled in terms of twelfths of periods of the supply. Each of the loops represents an interval during which one of the ignitrons of a group is conductive and is labeled accordingly.

During the first low frequency half period, each of the ignitrons 1TU, 3TU and 5TU is conductive twice. During the $\frac{1}{12}$ of a supply period, ignitron 1TU conducts current from right to left through winding 11. During this interval bus L1 is positive relative to the other buses. At the end of the interval bus L2 becomes positive with respect to L1, but ignitron 1TU continues to conduct because of the back potential provided by the winding 11. Now while ignitron 1TU is still conductive, ignitron 3TU is rendered conductive and current flows from right to left through winding 12. Thus current flow induces a potential across winding 11 which is so poled as to cause its right-hand terminal to become substantially positive with respect to its left-hand terminal. Ignitron 1TU is therefore extinguished. In the same manner as represented by their corresponding loops, ignitrons 5TU, 1TU, 3TU and 5TU are each in its term rendered conductive extinguishing the previously conductive ignitron. When ignitron 5TU is conductive for the second time, the ignitron 1TU is not again rendered conductive. The current flow through ignitron 5TU and its associated winding 13 then decays as shown by the sixth loop 5TU of the left-hand half wave of the curve. At this time the potential of the anode of ignitron 5TU is equal to the potential of bus L3, and the potential of its cathode is equal to the potential of bus L1 less the counteracting potential produced by winding 13. As the current flow through the ignitron 5TU is decaying, the potential of bus L1 is becoming more positive than the potential of bus L3 and this inverse difference of potential tends to extinguish ignitron 5TU. The ignitron 5TU is thus maintained conductive by the back electromotive force produced by the decay of flux in the transformer T, which is manifested as a potential across primary 13 in such a sense that the left-hand terminal of this primary is positive and the right hand terminal is negative. If the current flow through ignitron 5TU would be permitted to decay uninterruptedly, this potential across primary 13 eventually would become smaller than the negative potential between buses L1 and L3, and the ignitron 5TU would become non-conductive.

However, 1/12 of a period after ignitron 5TU was rendered conductive, ignitron 2TU is rendered conductive as represented by the first loop 2TU of the right half wave. As represented by the overlapping portion of the curve, the ignitron 2TU sometimes becomes conductive before the conductivity of ignitron 5TU is interrupted. This condition occurs particularly when the power factor of the load is low—of the order of 20% when calculated on the basis of 60-cycle supply. Ignitron 2TU conducts current from left to right through the primary 11 and induces a potential in primary 13 which increases the positive potential of its left terminal relative to its right terminal. This potential adds to the potential arising from the decaying flux and tends to maintain ignitron 5TU conductive as represented by the rising tail R on the positive curve. Power derived from the supply through ignitron 2TU between positive bus L2 and negative bus L3 is returned to the supply through ignitron 5TU between negative bus L3 and positive bus L1. In effect the supply is thus short circuited. The potential induced from primary 11 increases as represented by the first negative loop until ignitron 4TU becomes conductive when current flows from left to right through primary 12 as represented by the second negative loop. Again, a potential tending to maintain ignitron 5TU conductive, is induced and the latter, if it is still conductive, continues to conduct. Eventually, ignitron 6TU is rendered conductive as represented by the third negative loop and ignitron 5TU, if it is still conductive, is extinguished. However, ignitron 5TU has conducted for an excessively long interval under short-circuit conditions and eventually becomes so hot as to conduct continuously as the above-described process is repeated during successive welds. The short-circuit operation also materially deteriorates the transformer T. The above-described operation also occurs when ignitron 6TU fails to become non-conductive before ignitron 1TU becomes conductive.

In the apparatus actually shown in Figs. 1 and 1A, the reference numerals L1, L2 and L3 identify the lines of a three phase power source, the separate phases of which supply power to ignitrons 1TU and 2TU, 3TU and 4TU, 5TU and 6TU, arranged in back to back pairs, one pair across each phase of the source, and each pair supplying power to a separate one of primary windings 11, 12, 13 of a transformer T, the single secondary winding 14 of which supplies power to a welding load L.

Each of the ignitrons 1TU to 6TU, inclusive, is controlled by a thyratron firing tube, the respective thyratron firing tubes, identified by the designations 1FT through 6FT, being connected each in series between the anode and the igniting rod of an associated ignitron, so that firing of any thyratron initiates firing of the associated ignitron.

The control electrodes 15 of the firing tubes 1FT through 6FT are normally maintained biased back beyond the critical potential at which firing of the thyratrons may take place, by means of a D. C. voltage established at each of the firing tubes across a condenser 16. Direct current voltage is established across each of the condensers 16 by rectifying a voltage derived across the lines L1, L3, and applied via lines 6 to the primaries 17 of the transformers 18, having secondaries 19 connected in series with the condensers 16 via rectifying unit 20. Firing pulses are supplied to the firing tubes 1FT, 3FT and 5FT via lines 21, 22 and 23 respectively, and to firing tubes 2FT, 4FT and 6FT via lines 24, 25, 26 respectively, the firing tubes, in the absence of firing pulses supplied over the appropriate ones of lines 21 through 26, inclusive, being cut off, thereby cutting off the associated ignitrons 1TU through 6TU, and preventing transfer of current to the welding load L.

It will be clear, then, that any one of thyratrons 1FT through 6FT, inclusive, and hence any one of ignitrons 1TU through 6TU, inclusive, may be caused to fire by transferring an appropriate firing pulse of suitable polarity and magnitude, over the appropriate one of lines 21 through 26, inclusive, while the anode of the ignitron is positively polarized. The firing of any one of ignitrons 1TU, 3TU, 5TU will transfer to the load L a current of one polarity, which may for purposes of convenience in explaining the present invention be denominated positive, and transfer of current via any one of ignitrons 2TU, 4TU, 6TU will correspondingly cause flow of current in the load L in a direction opposite to the positive direction, and which may, therefore, be denominated negative.

Alternating current anode potential for the control tubes 1CT through 6CT is supplied over the three phase line L1, L2 and L3 via a transformer T2 having one primary winding 30 connected between lines L1 and L2, a second primary winding 31 connected between lines L2 and L3 and a third primary winding 32 connected between lines L1 and L3. The primaries of the transformer T2 accordingly are connected in delta with the three phase line L1, L2, L3. The secondary windings of the transformer T2, identified respectively by the numerals 33, 34 and 35, which are associated in the order named with the primaries 30, 31, and 32, respectively, are likewise connected in delta. Across the secondaries 33, 34 and 35 is a phase shift device generally denominated by the reference numeral 36, and which consists of three mechanically ganged potentiometers 37, 38 and 39 connected in delta with respect to the secondary windings 33, 34 and 35 of the transformer T2. Connected across the potentiometers 37, 38 and 39 are three resistances 40, 41 and 42, which are connected in Y, thereby establishing a neutral point 43 for the three phase system. The phase of the potentials established across the resistances 40, 41 and 42 with respect to the neutral point 43 may be varied by varying the movable contacts 44 of the potentiometers 37, 38 and 39 since the junction points between the potentiometers 37, 38 and 39 are connected to mid-points 45 of the secondary windings 33, 34 and 35 respectively of the transformer T2.

Three lines 46, 47 and 48 emanate from the variable taps 44 of the potentiometers 37, 38 and 39. The voltages on the lines 46, 47 and 48 are mutually displaced by a phase angle of 120°, since these voltages originate in the three phase lines L1, L2 and L3, and the potentials on the lines 46, 47 and 48 assume their positive maxima in succession, in the order in which the lines have been named. The phases of the voltages in the lines 46, 47 and 48 with respect to the voltages in the power lines L1, L2 and L3 may be shifted by shifting the contacts 44, these contacts being ganged to assure that any variation of phase which is introduced into one of the lines 46, 47 and 48 is likewise introduced into the remaining ones of these lines.

The line 46 supplies anode potential to the control tube 1CT via the primary winding 50 of a control transformer 1T having two secondary windings 51 and 52. The line 47 likewise leads to the anode of the control tube 3CT via the primary winding 53 of a control transformer 3T having two secondaries 54 and 55. Line 48 supplies anode potential to the control tube 5CT via the primary winding 56 of a control transformer 5T, having two secondaries 57 and 115. While the tubes 1CT, 3CT and 5CT are supplied with anode potential continuously, in phases which lag in succeeding ones of the tubes by 120°, the tubes are normally cut off, and prevented from firing, by means of a bias potential applied to the control electrodes thereof from a rectifier unit RX, to which is applied alternating current deriving across lines L1, L3 via a primary winding 60 of a transformer 61 having a secondary winding 62. The secondary winding 62 of transformer 61 is connected across two diagonally opposite terminals of the rectifier unit RX, and applied across a pair of series connected resistors 63, 64 across which is shunted a smoothing condenser 65. The mid-point of the resistors 63, 64 is connected with the control electrodes of the control tubes 1CT, 3CT, 5CT, in parallel, and the remaining terminal of the resistance 63 is connected with the cathodes of the control tubes 1CT, 3CT, 5CT, in parallel. Potential developed across the resistance 63 is utilized to establish a negative potential on the control grids of the tubes 1CT, 3CT and 5CT, which, in well known manner, prevents these tubes from firing regardless of the potentials which may be impressed on the anodes of the tubes.

Firing potential is applied to the control tubes 1CT, 3CT and 5CT in a manner now to be described. Considering first the tube 1CT, firing potential is applied to this tube over a pair of lines 66 in the form of a pulse. This pulse is derived from a sequence timer and frequency determining circuit 58 such as is shown in detail in Fig. 3 of application 52,103. The lines 66 of the system shown in Fig. 1A of the present application are identical to the lines 66 of Fig. 3 of application 52,103.

The occurrence of a firing pulse on the line 66 initiates a cycle of operation of the control tubes 1CT, 3CT and 5CT, and consequently, as will be hereinafter described, of the ignitrons 1TU, 3TU and 5TU. Occurrence of a pulse on the line 66, accordingly, signals initiation of a welding cycle. The pulse applied on the line 66 is applied to the primary 67 of a transformer 1F, having a secondary winding 68 which is connected with the control electrode of the control tube 1CT via a rectifying unit 69, there being connected across the secondary winding 68 and the rectifying unit 69, taken in series, a parallel combination of resistance 71 and condenser 70. The rectifier unit 69 rectifies the pulse supplied via the transformer 1F charging the condenser 70 in such sense as to render the control electrode of the control tube 1CT positive to an extent sufficient to establish ionization of the gas in the tube 1CT and consequently firing of the latter when the anode of the control tube 1CT goes positive. The time constant of the combination of condenser 70 and resistance 71 is sufficiently short to allow rapid decay of the charge of the condenser 70 after initiation of firing of the tube 1CT. The timing of the firing pulse established on the control electrode of the tube 1CT is synchronized in respect to the anode potential applied to the same tube, since the control pulse applied to the tube 1CT is derived from the same phase of the lines L1, L2, L3 as is the anode potential for the tube 1CT. The relative phase of the firing pulse applied to the control electrode of the control tube 1CT with respect to the anode potential applied to the tube 1CT is, of course, variable since the firing pulse occurs at a fixed time with respect to the voltage established on the supply lines L1, L2 and L3, while the anode potential applied to the control tube 1CT is applied to the latter via a phase shifting network 36, the latter being advanced by a variable time with respect to the timing of the firing pulse.

Firing of the tube 1CT establishes a pulse of current in the primary winding 50 of the transformer 1T, this pulse being transferred, first, via the secondary 51 of the transformer 1T to the grid pulsing circuit 72 of the control tube 3CT, which is in all respect identical with the grid pulsing circuit illustrated in conjunction with the tube 1CT, the operation of which has been described hereinbefore. The pulse applied via the secondary winding 51 accordingly is rectified and applied to the control electrode of the control tube 3CT, permitting that tube to fire when its anode potential becomes positive. Anode potential for the tube 3CT is supplied thereto over the line 47 and the primary winding 53 of the transformer 3T.

Accordingly, the control tube 3CT will conduct current at a time following the firing of the tube 1CT, this time being established by the time of application of positive potential to the anode of the control tube 3CT. Firing of the tube 3CT establishes a pulse of current in the primary winding 53 of the transformer 3T, which is transferred via the secondary winding 54 of the transformer 3T to pulsing circuit 73 of the control electrode of the control tube 5CT, the latter pulsing circuit again being identical with the pulsing circuit 72 and establishing a pulse voltage for application to the control electrode of the control tube 5CT.

Application of positive control pulse to the control electrode of the control tube 5CT establishes current flow in the latter when the anode potential of the latter becomes positive, anode potential being applied to the control tube 5CT via the line 48 and the primary winding 56 of the transformer 5T. The pulse of current established in the primary winding 56 is not re-transferred back to the first one of the control tubes, 1CT, but the sequential operation of the control tubes 1CT, 3CT, and 5CT now terminates, unless a further control pulse is applied to the primary winding 67, and the transformer 1F, via the line 66. Should such a further control pulse be established a further firing sequence will occur, the tubes 1CT, 3CT and 5CT firing sequence in a further cycle of operation, duplicating the sequence of operations above described.

Associated with the primary winding 50 of the transformer 1T is a secondary winding 52 which is connected via the lead 21 with the control electrode and cathode of firing tube 1FT which determines the time of firing of the ignitron 1TU, establishing a firing potential on the control electrode of the tube 1FT at a proper time to enable firing of the tube, that is, while the anode of the tube 1FT is positive. Firing of the tube 1FT establishes a pulse of current through the ignitor electrode of the ignitron 1TU, which establishes firing of the ignitron 1TU, enabling transfer of a pulse of current to the welding load L via the primary winding 11 and the secondary winding 14 of the transformer T.

When the control tube 3CT fires, likewise, the pulse of current in the primary winding 53 of the transformer 3T transfers voltage to the secondary winding 55 of the transformer 3T, the pulse of voltage being applied via the line 22 to the control electrode of the firing tube 3FT, which in turn establishes a firing time for the ignitron 3TU, and consequently a positive pulse of current in the welding load L, via the primary winding 12 of the transformer T, and the secondary winding 14 of the latter.

Firing of the control tube 5CT likewise establishes a pulse in the primary winding 56 of the transformer 5T, which is translated into a voltage pulse in the secondary winding 57 of the latter, this voltage pulse being transferred via the line 23 to the control electrode of the firing tube 5FT, which thereupon fires and establishes firing of the ignitron 5TU. The latter, in turn, transfers a positive pulse to the welding load L via the primary winding 13 of the transformer T, and the secondary winding 14 thereof.

In summary then, each transfer of a pulse to the line 66 establishes a sequential operation of the control tubes 1CT, 3CT and 5CT, the latter providing control pulses in sequence to the firing tubes 1FT, 3FT and 5FT, which cause firing of the ignitrons 1TU, 3TU and 5TU, in sequence, and with phase separation of 120°, thereby to establish a positive pulse in the welding load for a time equal to 360° of the supply frequency. The system then requires and enforces firing of the ignitrons 1TU, 3TU and 5TU in groups of three, in response to the application of a single control pulse on the line 66, and the firing sequence of the ignitrons 1TU, 3TU and 5TU cannot be interrupted or disestablished, once it has been initiated, until all three ignitrons have been fired. One or more sequences of operation may be initiated in like manner by application of succeeding control pulses to the line 66, and interruption of welding current may be accomplished at any time after completion of a complete firing sequence of the ignitrons 1TU, 3TU, 5TU, by failure to supply a control pulse to the line 66.

The control tubes 2CT, 4CT and 6CT operate in a manner entirely similar to that described above as applying to the control tubes 1CT, 3CT and 5CT, initiation of firing of the tubes 2CT taking place in response to application of a control pulse to the lines 80. The lines 80 of Fig. 1A are identical to the lines 80 of Fig. 3 of application 52,103. This pulse establishes a firing control voltage in the control electrode circuit 81 of the control tube 2CT, to which is normally applied a negative off-biasing potential established across the resistance 82 by rectification in the rectifier unit 83 of alternating current supplied over the line 84 from the secondary winding 85 of a transformer 86 having a primary winding 87. The transformers 88 and 89 are utilized to establish, in a like manner, off biasing potentials for the control electrodes of the control tubes 4CT and 6CT, the control tube 4CT including in its grid circuit a resistor 99 connected in series with rectifier unit 91 and with the secondary winding of the transformer 88, and the control electrode of the control tube 6CT containing in circuit a bias resistance 92 connected in series with a rectifier unit 93 and with the secondary winding of the transformer 89.

Connected in series with the cathode circuit of the control tube 2CT is a primary winding 94 of a transformer 2T, the latter having a secondary winding 95 which is connected with the control electrode circuit of the control tube 4CT by means of a pulse rectifying circuit 96, which is identical with the pulse rectifying circuit associated with the control tube 1CT, and with the pulse rectifying circuit associated with the control circuit 81 associated with the tube 2CT, and which has been described in detail hereinbefore. Accordingly, firing of the tube 2CT is followed by firing of the tube 4CT, upon establishment thereat of a suitable positive anode potential. There is likewise connected in the cathode circuit of the tube 4CT primary winding 97 of a transformer 4T, the secondary winding 98 of which is applied to the input circuit 99 of the control tube 6CT, the latter being identical with the control circuits 96 and 81 associated with the control tubes 4CT and 2CT, respectively. Accordingly, firing of the tube 4CT is accompanied by application of a firing pulse to tube 6CT, which fires when the anode potential thereof attains a suitable positive value.

Firing of the control tube 6CT terminates the firing cycle of the tubes 2CT, 4CT and 6CT unless a further control pulse is applied over the line 80 to the input transformer 2F of the control tube 2CT.

Included in the transformer 2T is a secondary winding 100 which, in response to a current pulse in the primary winding 94 of the transformer 2T, translates a voltage pulse via the line 24 to the firing tube 2FT associated with the ignitron 2TU, establishing a firing time for the latter upon firing of the firing tube 2FT.

Associated with the transformer 4T, which is connected in the cathode circuit of the control tube 4CT is a secondary winding 101, which transfers a voltage pulse via the line 25 to the circuit of the control electrode of the firing tube 4FT, which fires in response to the voltage pulse, and in firing causes firing of the ignitron 4TU. Similarly, a secondary winding 105 is magnetically coupled with the primary winding of the transformer 6T, which is connected in series with the cathode circuit of the control tube 6CT, so that firing of the control tube 6CT accomplishes transfer of a voltage pulse via the line 26 to the firing tube 6FT, which breaks down in response to a control pulse established on the line 80, the control tubes 2CT, 4CT and 6CT break down in sequence, transferring firing pulses to the firing tubes 2FT, 4FT and 6FT in sequence, and these latter, in firing, accomplish firing of the associated ignitrons 2TU, 4TU and 6TU in similar sequence, applying overlapping negative pulses of potential to the negative load L via the primary windings 11, 12 and 13 of the welding transformer T. The ignitrons 2TU, 4TU and 6TU accordingly fire in sequence, in groups of three, in response to a single control pulse applied to the leads 80, and successive firing sequences take place only in response to successive applications of pulses to the line 80, firing terminating after firing of the tube 6TU, unless a further firing sequence is initiated.

The circuits of Figs. 1 and 1A as thus far described are similar to those shown in Figs. 1 and 2 of application Serial No. 52,103. The results of operation of such a circuit have been previously described in connection with Fig. 2.

In accordance with my invention, I provide a pair of auxiliary control circuits which I designate generally at 107 and 108. These circuits are, except for their external connections, similar to control circuits previously described, for example, those associated with control tubes 5CT and 6CT. Auxiliary control tubes 7CT and 8CT are connected to be associated with ignitrons 1TU, and 2TU respectively. Each auxiliary control tube has a bias hold off circuit indicated generally at 109, 110, supplied from lines 84 through transformers 111, 112 and a pulse rectifying circuit indicated generally at 113, 114, respectively. Anode voltage is supplied to the tubes 7CT and 8CT from a mid-tap connection on the L2 side of the secondary 34 of the anode voltage supply transformer T2 whose primary 31 is connected across L2 and L3. Pulses derived from secondaries 115, 116 of transformers 5T and 6T are supplied to the pulse rectifying circuits 113, 114 to fire the control tubes 7CT and 8CT at the proper times. Transformers 117, 118 have primary windings 119, 120 connected in the anode circuits of the auxiliary control tubes 7CT, 8CT, respectively. The secondaries 121, 122 of these transformers are connected in the grid circuits of the firing thyratrons 1FT, 2FT which control the first pair of ignitrons 1TU and 2TU, respectively.

Figure 3:
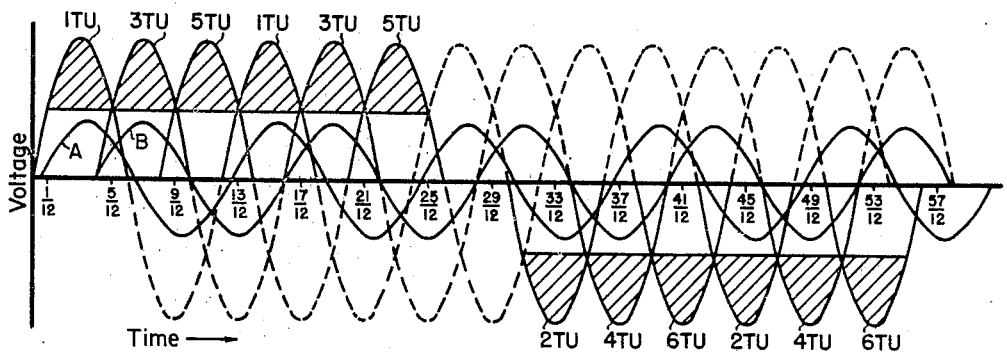
Figs. 3 and 4 are graphs illustrting the operation of the apparatus shown in Figs. 1 and 1A.
Figure 4:
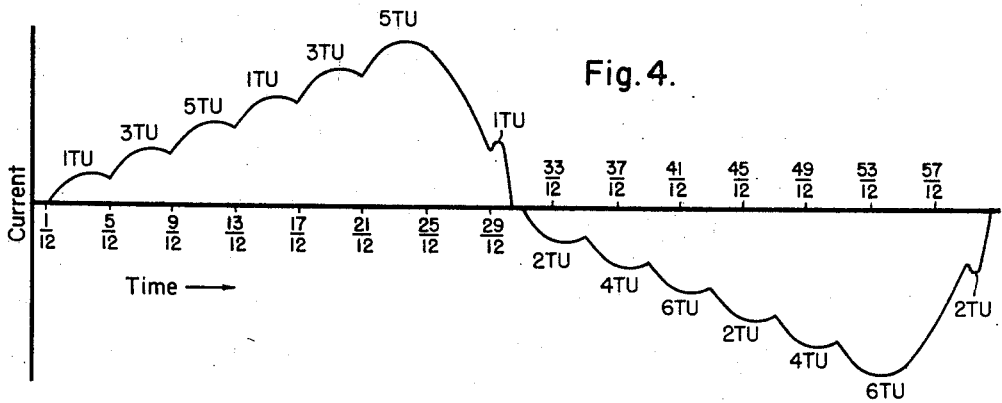

This operation may be explained in connection with the graphs shown in Figs. 3 and 4. In Fig. 3, voltage is plotted against time, and in Fig. 4, current is plotted against time, using the same time scale as in Fig. 3. In Fig. 3, the curves 1TU, 3TU, 5TU, 2TU, 4TU, 6TU depict the three phase line voltages (their relative magnitudes being taken with respect to each other) applied to the respective ignitrons. The shaded areas represent the length of time during which a particular ignitron is being fired. Starting from a zero time, it is assumed that the circuit-constants are such that the first ignitron is fired 30° or $\frac{1}{12}$ of a line voltage period after zero. Curve A of Fig. 3 represents the anode voltage on control tubes 1CT, 2CT, which is derived between a contact 44 of potentiometer 39 and neutral 43 of the phase shifting network 36. Curve B of Fig. 3 represents the anode voltage on auxiliary control tubes 7CT, 8CT, derived from the mid-tap connection on a secondary 34 of supply transformer T2.

Assume that two consecutive pulses from the sequence timer and frequency determining circuit 58 have been put on lines 66 to cause the ignitrons to fire the sequences 1TU, 3TU, 5TU, 1TU, 3TU, 5TU. In prior art apparatus, 5TU would fire the last time at time $^{21}/_{12}$ and the welding current would decay relatively slowly, resulting in a current overlap as shown by the tail R in Fig. 2. However, in accordance with my invention, when the control tube 5CT conducts to energize the secondary 57 of the transformer 5T to cause the firing of the ignitron 5TU, it also energizes the secondary 115 of transformer 5T which energizes the pulse rectifying circuit of the control tube 7CT. The control tube 7CT then fires when its anode voltage (curve B, Fig. 3, at approximately times $^{17}/_{12}$ and $^{29}/_{12}$) swings positive. When this firing of tube 7CT occurs during the interval when ignitron 1TU is rendered conductive early in a half period of the supply (at approximately instant $^{13}/_{12}$ Fig. 3), it has no effect on the operation of the apparatus. However, when the firing of 7CT occurs during an interval when ignitron 1TU has not been fired (instant $^{29}/_{12}$ following instant $^{25}/_{12}$) it causes ignitron 1TU to fire late in its positive half period. The firing of control tube 7CT energizes the secondary 121 of transformer 117, which in turn energizes the pulse rectifying circuit of the firing tube 1FT for the ignitron 1TU. Since before the instant $^{29}/_{12}$ firing tube 1FT was not rendered conductive because it received no pulse from control tube 1CT, firing tube 1FT now conducts, as a result of a pulse received from auxiliary control tube 7CT. Therefore, referring to curve B of Fig. 3, ignitron 1TU is fired just before the time $^{29}/_{12}$.

The current conducted by ignitron 1TU flows through welding transformer primary 11 from right to left, and by reason of leakage flux in the welding transformer, impresses a potential across winding 13 in a direction such as to extinguish ignitron 5TU. Since ignitron 1TU was fired near the end of the positive half period of the source potential, this potential soon after the firing of this ignitron becomes negative and positively forces the decay of the flux in the welding transformer. As shown in Fig. 4, the welding current increases slightly after 1TU is fired at time approximately $^{29}/_{12}$, and then decreases rapidly to zero before the time $^{31}/_{12}$. Ignitron 2TU then may be fired at time $^{31}/_{12}$ to start the negative half period of the low frequency current.

The firing circuit 108 of control tube 8CT functions in the same manner to fire 2TU late in its corresponding half period of the supply at about time $^{59}/_{12}$ to cause the welding current to decay to zero before 1TU is again fired to begin the next positive low frequency half period.

Figure 5:
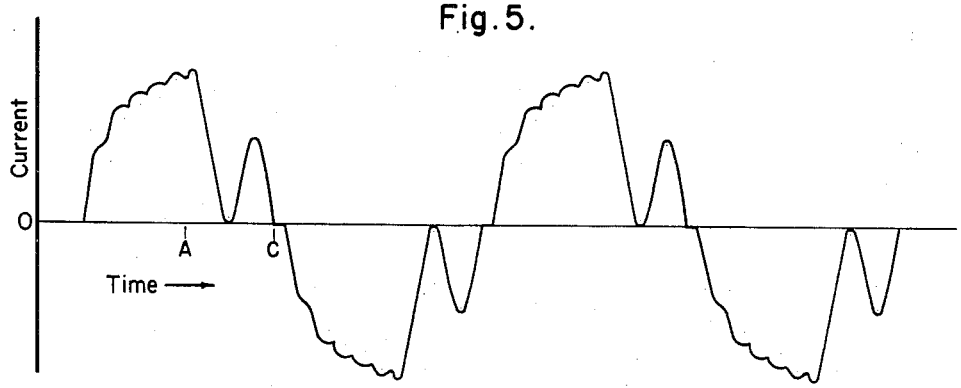
Fig. 5 is an actual oscillogram of the current wave of prior art apparatus in operation.
Figure 6:
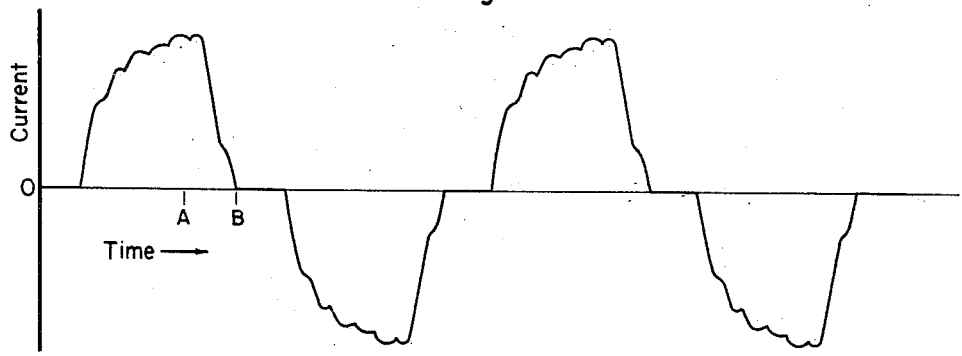
Fig. 6 is an actual oscillogram of the current wave of apparatus according to my invention in operation.

The results obtained by operation of apparatus in accordance with my invention may be readily compared by reference to Figs. 5 and 6. Fig. 5 is an actual oscillogram taken of apparatus in which the ignitrons are fired successively to build up low frequency current. The current is allowed to decay at will before the first ignitron on the low frequency period of opposite polarity is fired. It will be noted (Fig. 5) that with such operation the last ignitron to fire in the first low frequency half period must conduct current from time A to time C. Repeated conduction for such excessive time will cause severe damage to the ignitron. Further, if low frequency half period of opposite polarity were fired before time C, a short circuit would develop in the welding transformer primary windings as has been previously explained.

Now refer to Fig. 6 which is an actual oscillogram taken of apparatus being operated in accordance with my invention. In this operation, the first ignitron to be fired in a low frequency half period is also fired late in its corresponding half period of the supply immediately following the firing (Fig. 6, time A) of the last ignitron to be fired in the particular low frequency half period. With such operation, the welding current is forced to decay to zero at time B. No ignitron conducts for an excessive time. The low frequency half period of opposite polarity could be initiated at or immediately after time B without any danger of developing a short circuit in the welding transformer primary windings.

The system of my invention provides positive protection against welding transformer short circuits caused by current overlap. Since ignitrons 1TU and 2TU are connected back to back, the anode of 2TU is negative as long as 1TU is conducting. One of these ignitrons is always the last to fire on a low frequency half cycle and the other is first to fire on the following low frequency half cycle, therefore there can never be current overlap between consecutive low frequency half cycles. It should be pointed out that my interlock system is entirely electronic, and, therefore, the possibility of non-operation due to sticking, open, or faulty relay operation is eliminated.

It will also be apparent that with the system of my invention, there will be substantially the same time interval between the beginning of opposite low frequency half cycles and all low frequency half cycles will be of substantially the same duration. Consequently, any tendency toward welding transformer saturation is minimized.

In situations in which the load constitutes an excessively large drain on the supply a system in accordance with my invention as specifically described above may not suffice to absorb completely the effect of the decaying flux in the load. In such situations it may be desirable to fire the ignitrons 3TU and 4TU, respectively, late in the half periods following the late firing of ignitrons 1TU and 2TU, respectively. This object may be accomplished by providing additional tubes similar to the tubes 7TU and 8TU which are supplied with potential counteracting a blocking potential from auxiliary secondaries of transformers 117 and 118, respectively. One of these additional tubes is fired at instant $3\%_{12}$ to cause ignitron 3TU to fire late in its half period. The other is fired at a corresponding instant to cause ignitron 5TU to conduct late in its period. Apparatus including such additional auxiliary tubes is within the scope of my invention.

In certain situations the load may require pulses of only one polarity. In such systems only one group of ignitrons (1TU, 3TU, 5TU or 2TU, 4TU, 6TU) and their associated firing circuits are interposed between the supply L1, L2, L3 and the load. To such systems my invention, within its broader scope, is applicable. Such a system would include the circuit 53 and only the control tubes 1CT, 3CT, 5CT and 7CT. When applied to such systems my invention has the advantage that the third ignitron (5TU, or 6TU) is positively and quickly extinguished and does not conduct current during excessive intervals.

My invention, within its broader scope, is also applicable to a single phase low frequency system such as is shown in application Serial No. 87,684. In this single phase system two additional thyratrons are provided in the control circuit and connected to fire, late in the half periods of the supply, the ignitrons 11 and 15 which are fired first in each group respectively. These additional thyratrons would be fired from auxiliary secondaries of transformers 193 and 249.

Although I have shown and described a specific embodiment of my invention, I am fully aware that many modifications of my invention are possible. My invention, therefore, is not to be restricted except insofar as is necessitated by the prior art and by the spirit of the appended claims.

I claim as my invention:

1. In combination $n$ pairs of main terminals adapted to supply alternating potentials displaced in phase by $$\frac{360°}{n}$$

a main electric discharge path defined by an anode and a cathode associated with each said pairs; a main output circuit associated with each said pairs; each said pair being connected in circuit with its associated path and its associated output circuit; at least one pair of auxiliary terminals adapted to supply a potential lagging in phase the potential supplied by one of said main pairs by an angle between 90° and 180°; and an auxiliary discharge path defined by an anode and a cathode and an auxiliary output circuit associated with said auxiliary terminals, said auxiliary path and said auxiliary output circuit being connected in circuit with said auxiliary terminals and said auxiliary output circuit being connected to the main output circuit associated with said one pair of main terminals to superimpose its output on the output of said last-named main circuit.

2. In combination $n$ pairs of main terminals adapted to supply alternating potentials displaced in phase by $$\frac{360°}{n}$$

a main electric discharge path defined by an anode and a cathode associated with each said pairs; a main output circuit associated with each said pairs; each said pairs being connected in circuit with its associated path and its associated output circuit; at least one pair of auxiliary terminals adapted to supply a potential lagging in phase the potential supplied by one of said main pairs by an angle between 90° and 180°; an auxiliary discharge path defined by an anode and a cathode and an auxiliary output circuit associated with said auxiliary terminals, said auxiliary path and said auxiliary output circuit being connected in circuit with said auxiliary terminals and said auxiliary output circuit being connected to the main output circuit associated with said one pair of main terminals to superimpose its output on the output of said last-named main circuit; means for firing the discharge path associated with said one pair of main terminals; and means responsive to the conductivity of said last-named path for firing the other paths in succession, said auxiliary path being the last of said succession of paths fired.

3. In combination $n$ pairs of main terminals adapted to supply alternating potentials displaced in phase by $$\frac{360°}{n}$$

a main electric discharge path defined by an anode and a cathode associated with each said pairs; a main output circuit associated with each said pairs; each said pairs being connected in circuit with its associated path and its associated output circuit; at least one pair of auxiliary terminals adapted to supply a potential lagging in phase the potential supplied by one of said main pairs by an angle between 90° and 180°; an auxiliary discharge path defined by an anode and a cathode and an auxiliary output circuit associated with said auxiliary terminals, said auxiliary path and said auxiliary output circuit being connected in circuit with said auxiliary terminals and said auxiliary output circuit being connected to the main output circuit associated with said one pair of main terminals to superimpose its output on the output of said last-named main circuit; means for firing the discharge path associated with said one pair of main terminals; and means responsive to the conductivity of said last-named path for firing the other paths in succession, the output circuit of each said other paths being connected to fire a succeeding path and the output circuit of the last in sequence of said main paths to fire being connected to fire said auxiliary path.

4. In combination a first main discharge path defined by an anode and a cathode, intervening main discharge paths each defined by an anode and a cathode and at least one auxiliary discharge path defined by an anode and a cathode; each said paths having a control circuit, a transformer having a primary, a control secondary and an output secondary associated with said main and intervening paths, the primary of each transformer being connected in circuit with the anode and cathode of its associated path, the control secondary associated with said first path being connected in the control circuit of an intervening path, the control secondaries associated with each intervening path except a last intervening path being connected in the control circuit of another intervening path and the control secondary of said last path being connected in the control circuit of said auxiliary path; and an auxiliary transformer having a primary and at least a secondary associated with said auxiliary path, the primary of said auxiliary transformer being connected in circuit with the anode and cathode of said auxiliary path and the secondary being connected in circuit with the secondary of the transformer associated with said first main path.

5. In a system for converting power to be derived from an alternating source having a first frequency and to be supported to a load at a second frequency; the combination comprising in effect a pair of electric discharge paths each defined by an anode and a cathode, to be interposed in anti-parallel between said source and said load, each said path having a control electrode associated therewith; a first control circuit coupled to the control electrode of a first of said paths including means to supply a potential for rendering said first path conductive early in its positive half periods of said supply; a second control circuit coupled to the control electrode of said first path and including means actuable in response to actuation of said first circuit for supplying a potential for rendering said first path conductive late in its positive half period of said supply; a third control circuit coupled to the control electrode of the other of said paths including means for supplying a potential for rendering said second paths conductive early in the positive half periods of said supply; and a fourth control circuit coupled to said control electrode of said other path and including means actuable in response to actuation of said third circuit for supplying a potential for rendering said other path conductive late in the positive half periods of said supply; said second and fourth circuits once actuated continuing effective to render their corresponding paths conductive after said first and third circuits have become ineffective.

6. In a system in which power is supplied from a polyphase supply, composed of $n$ pairs of buses from each pair of which an alternating potential may be derived, to a reactive load the combination comprising; an electric discharge path defined by an anode and a cathode connected between each said pairs of buses and said load each said path having a control electrode; a control circuit coupled to each said control electrode; connections for supplying a potential to said control circuits in a predetermined succession to render the discharge paths to which they are respectively coupled conductive in said succession at predetermined instants in the positive half periods of the pairs of buses respectively to which said paths are connected; an additional control circuit coupled at least to the control electrode of the first of said paths to be rendered conductive in said succession and connections, responsive to actuation of said first-named control circuits for supplying a potential to said additional circuit to render said first path conductive late in the positive half periods supplied by the bus pair to which it is connected, said additional circuit once actuated continuing effect to render said first path conductive after said first-named control circuits have become ineffective.

7. In a system for converting power to be derived from an alternating source having a first frequency and to be supplied to a load at a second frequency; the combination comprising first and second electric discharge paths, each defined by an anode and a cathode, interposed in anti-parallel between said source and said load, each said path having a control electrode associated therewith; a first control circuit coupled to the control electrode of said first path including first means for rendering said first path conductive early in its positive half periods of said supply; a second control circuit coupled to the control electrode of said first path including second means for rendering said first path conductive late in its positive half period of said supply; a third control circuit coupled to the control electrode of said second path including third means for rendering said second path conductive early in the positive half periods of said supply; a fourth control circuit coupled to said control electrode of said second path including fourth means for rendering said second path conductive late in the positive half periods of said supply; means cooperative with said first and second control circuits for rendering said first means effective during a first predetermined number of successive positive half periods of said first path and said second means only effective during a second predetermined number of positive half periods of said first path after said first number of half periods; and means cooperative with said third and fourth control circuits for rendering said third means effective during a predetermined third number of positive half periods for said second path after said second number and said fourth means only effective during a predetermined number of positive half periods of said second path after said third number of half periods.

8. In a system for supplying power from a polyphase supply, composed of $n$ pairs of buses from each pair of which an alternating potential may be derived, to a reactive load the combination comprising; an electric discharge path defined by an anode and a cathode connected between each said pairs of buses and said load, each said path having a control electrode; a control circuit coupled to each said control electrode; connections to each said control circuit for actuating said control circuits, each in its turn, in a predetermined succession, said connections each including means to render the discharge path to which it is coupled conductive in said succession at a predetermined instant relatively early in the positive half periods of the first pair of buses to which said path is connected; an additional control circuit coupled to the control electrode only of the first of said paths to be rendered conductive in said succession; and connections for actuating said additional circuit including means to render said first path conductive late in the positive half periods supplied by the bus pair to which it is connected.

9. In apparatus for converting power of one frequency to be derived from a pulsating supply to a substantially lower frequency, which apparatus includes a plurality of electric discharge paths, each defined by an anode and a cathode, and a main firing circuit for each said paths, said firing circuits including a first means for impressing potentials during a predetermined discrete period to fire said paths periodically in a predetermined succession during successive pulsations of said supply for predetermined intervals equal in duration to the duration of a pulsation of said lower frequency, the novelty of an auxiliary firing circuit cooperative with said main firing circuits and including a second means for impressing a potential at least on the first of said succession of paths, to be fired as aforesaid, late in its corresponding pulsations of the supply, said last named potential being impressed immediately after termination of said discrete period whereby said first path is fired late in its pulsations of the supply immediately following the firing of the last of the succession of paths to be fired during said interval; said second means for impressing a potential having connections, to said first of said succession of paths to be fired, during each said interval, in common with said first means for impressing a potential.

10. In apparatus for converting power of one frequency to be derived from a pulsating polyphase supply to a substantially lower frequency to be supplied to a transformer having a plurality of primaries; a first group of electric discharge paths, each defined by an anode and a cathode and each connected in series with a primary winding of said transformer and a phase of said supply; a second group of electric discharge paths each defined by an anode and a cathode and each connected in anti-parallel with a corresponding electric discharge path of said first group; a main firing circuit for each of said paths, each said firing circuit including means for impressing a potential to fire its corresponding path; and means common to said potential impressing means for actuating said potential impressing means so that the potential impressing means of the first group of paths impresses a potential on each discharge path of said first group to fire said paths in a predetermined succession during successive phase pulsations of said supply for a predetermined first interval equal in duration to the duration of a pulsation of said lower frequency while the potential impressing means of the second group of paths are quiescent and after said first interval the potential impressing means of said second group impresses a potential on each discharge path of said second group in a like manner for a predetermined second interval while the firing circuits of said first group are quiescent; the novelty of an auxiliary firing circuit cooperative with and having connections in common with such of the main firing circuits of said first and second groups, each said auxiliary circuit including auxiliary means for impressing a potential to fire at least the first path of its group to fire during said interval, said auxiliary means being actuable from said common means so that a potential is impressed to fire on the first path of said first group late in the corresponding half period of its phase of said source immediately following the firing of the last path to fire during said first interval whereby the corresponding first path of said second group may be fired at the beginning of the next half period of the same phase of said supply to initiate said second pulsation of said lower frequency, without producing a short circuit in the windings of said transformer and thereafter a potential is impressed to fire the first path of said second group late in the corresponding half period of its phase of said source immediately following the firing of the last path to fire during said second interval whereby the corresponding path of said first group may be fired at the beginning of the next half period of the same phase to initiate the third pulsation of said lower frequency without producing a short circuit in the winding of said transformer.

11. Apparatus, for converting power of one frequency to be derived from a pulsating supply to a substantially lower frequency, comprising, in combination, a plurality of electric discharge paths, each defined by an anode and a cathode; a main firing circuit for each said paths, said firing circuits including means for impressing a potential on each said path in its turn to fire said paths periodically in a predetermined succession during successive pulsations of said supply for predetermined intervals equal in duration to the duration of a pulsation of said lower frequency; main pulse source means coupled to said potential impressing means for initiating the firing of a succession of paths during an interval; and auxiliary pulse source means actuable by said main pulse source means and having connections in common with at least the first of said paths to be fired during each said interval for impressing a potential to fire said first path late in its corresponding half period of the supply immediately following the firing of the last of the succession of paths to be fired during said interval.

12. Apparatus, for converting power of one frequency to be derived from a pulsating supply to a substantially lower frequency, comprising, in combination, a plurality of electric discharge paths, each defined by an anode and a cathode; a firing circuit for each said paths, said firing circuits each including means for impressing a potential on each said path in its turn to fire said paths periodically in a predetermined succession during successive pulsations of said supply for predetermined intervals equal in duration to the duration of a pulsation of said lower frequency; a main pulse source means coupled to said impressing means for initiating the firing of a succession of paths during an interval; and auxiliary pulse source means, responsive to the said potential-impressing means for one of the paths when it operates to fire said path during an interval, for impressing a potential on the firing circuit at least of the first of said paths to be fired during each said interval late in its corresponding half period of the supply immediately following the firing of the last of the succession of paths to be fired during said interval to fire said first path late in said last-named half period.

13. Apparatus, for converting power of one frequency to be derived from a pulsating supply to a substantially lower frequency; comprising, in combination, a first plurality of terminals; a second plurality of terminals, each of said last-named terminals corresponding to a terminal of said first plurality; a pair of electric discharge paths each defined by an anode and a cathode connected in anti-parallel between each of said first terminals and its corresponding second terminal; a firing circuit for each of said paths, each firing circuit including means for impressing a potential on the corresponding path to fire said path; means common to said paths to actuate said paths so that said potentials are impressed to fire a selected one path of each said pair periodically in a predetermined succession during successive pulsations of said supply for predetermined intervals equal in duration to the duration of a pulsation of said lower frequency; a main pulse source means coupled to said potential impressing means for initiating the firing of a succession of said selected paths during an interval; and auxiliary pulse source means responsive to said main pulse source means and including means for supplying a potential to the firing circuit at least of the first of said paths to be fired during each interval late in its corresponding half period of the supply immediately following the firing of the last of the succession of paths to be fired during said interval to fire said first path late in its half period of the supply.

14. Apparatus, for converting power of one frequency to be derived from a pulsating supply to a substantially lower frequency; comprising, in combination, a first plurality of terminals; a second plurality of terminals, each of said last-named terminals corresponding to a terminal of said first plurality; a pair of electric discharge paths each defined by an anode and a cathode connected in anti-parallel between each of said first terminals and its corresponding second terminal; a firing circuit for each of said paths; a main control circuit associated with each of said firing circuits for supplying a potential to fire the corresponding path; means for supplying said main control circuits for all said paths in synchronism with said supply so that said potentials are impressed in a selected one of each said pair so as to fire said selected paths periodically in a predetermined succession during successive pulsations of said supply for predetermined intervals equal in duration to the duration of a pulsation of said lower frequency; a main pulse source means coupled to said potential impressing means for initiating the firing of a succession of said selected paths during an interval and a control circuit associated with at least the control circuit of one of said selected paths, responsive to the firing of another of said selected paths during an interval, for supplying a potential to said one selected path during each interval, late in its corresponding half periods of the supply immediately following the firing of the last of the succession of paths to be fired during said interval to fire said one path late in its corresponding half period of said supply.

15. In combination $n$ supply terminals adapted to be connected to a polyphase supply; $n$ load terminals; a pair of electric discharge paths each defined by an anode and a cathode interposed in anti-parallel between each supply terminal and a corresponding load terminal; a main firing circuit for each said paths; a control circuit for supplying a potential to each firing circuit to fire the corresponding path; means for supplying said control circuits in common so that said control circuit when actuated supply potential to fire a selected path of each said pairs early in its corresponding positive half-period of said supply in succession during a predetermined interval to cause said selected paths to conduct current of one polarity during said interval and thereafter during a succeeding predetermined interval to supply potential to fire the other path of each said pairs in succession early in its corresponding positive half period of said supply to conduct current of the opposite polarity during said succeeding interval; an auxiliary control circuit coupled to the firing circuit of at least each of the paths of one of said pairs of paths, said auxiliary circuit when actuated supplying a potential to each one of said one of said pairs of paths to fire each of said one of said pairs of paths late in its corresponding half period of said supply during the interval during which it is conductive.

16. In combination, an electric discharge path defined by an anode and a cathode; terminals connected to said path and adapted to impress a periodic potential between said anode and cathode; means including connections to said path for impressing a first signal on said path through said connections during each of a first group of selected successive periods of said potential, said first signal having a phase and magnitude to render said path conductive early in said periods of said potential; and means including said connections, to impress a second signal on said path, through said connections, during each of a second group of selected successive periods of said potential at least equal in number to the number of said first group, said second signal having a phase and a magnitude such as to render said path conductive late in the periods of said potential, said second group starting one period after said first group, whereby said second signal is impressed alone during at least one of the periods of said potential following the last period of said first group during which a first signal is impressed.

17. Apparatus for controlling the supply of power from a polyphase source having $n$ pairs of phase conductors to a transformer having $n$ primaries comprising in combination: $n$ electric discharge paths each defined by an anode and a cathode and including a control electrode; means for connecting the anode and cathode of one of said paths each in series with one of said primaries and one of said pairs of phase conductors; means adapted to be supplied from said source for impressing potentials on the control electrodes of said paths to render said paths, each in its turn, conductive in a predetermined succession early in selected respective positive half periods of said source so that current of one polarity flows through said primaries during said selected half periods; and means, adapted to be supplied from said source, for impressing potentials on at least one of said paths to render at least said one path conductive late in certain selected positive half periods of said source, at least one of which last-named half periods follows immediately after the last of said first-named half periods.

18. Apparatus for controlling the supply of power from a polyphase source having $n$ pairs of phase conductors to a transformer having $n$ primaries comprising in combination: $n$ electric discharge paths each defined by an anode and a cathode and including a control electrode; means for connecting the anode and cathode of one of said paths each in series with one of said primaries and one of said pairs of phase conductors; means adapted to be supplied from said source for impressing potentials on the control electrodes of said paths to render said paths, each in its turn, conductive in a predetermined succession early in selected respective positive half periods of said source so that current of one polarity flows through said primaries during said selected half periods; and means, adapted to be supplied from said source, and actuable in response to said last-named potential impressing means, for impressing potentials on at least one of said paths to render said one path conductive late in positive half periods of said source immediately following the last of said selected positive half periods, at least one of which last-named half periods follows immediately after the last of said first-named half periods.

JOHN R. PARSONS.

REFERENCES CITED

The following references are of record in the file of this patent:

UNITED STATES PATENTS

| Number | Name | Date |
|---|---|---|
| Re. 22,314 | Dawson | May 18, 1943 |
| 1,954,661 | Alexanderson | Apr. 10, 1934 |
| 2,083,190 | Dawson | June 8, 1937 |
| 2,084,159 | Mittag | June 15, 1937 |
| 2,319,524 | Undy | May 18, 1943 |
| 2,356,859 | Leathers et al. | Aug. 29, 1944 |
| 2,474,867 | Sciaky | July 5, 1949 |